(12) United States Patent
Dobashi

(10) Patent No.: US 7,142,243 B2
(45) Date of Patent: Nov. 28, 2006

(54) IMAGE SENSING APPARATUS HAVING A MEMBER THAT ADJUSTS WITH TEMPERATURE CHANGE

(75) Inventor: Hideki Dobashi, Tokyo (JP)

(73) Assignee: Canon Kabushiki Kaishi, Tokyo (JP)

( * ) Notice: Subject to any disclaimer, the term of this patent is extended or adjusted under 35 U.S.C. 154(b) by 1027 days.

(21) Appl. No.: 10/147,865

(22) Filed: May 20, 2002

(65) Prior Publication Data

US 2002/0186318 A1    Dec. 12, 2002

(30) Foreign Application Priority Data

May 22, 2001    (JP)    ............................. 2001-152961

(51) Int. Cl.
*H04N 5/225*    (2006.01)
*G02B 7/02*    (2006.01)

(52) U.S. Cl. ...................... 348/340; 348/374; 359/820

(58) Field of Classification Search ................ 348/294, 348/335, 340, 373, 374; 257/294; 438/69; 359/813, 819, 820

See application file for complete search history.

(56) References Cited

U.S. PATENT DOCUMENTS

| | | | |
|---|---|---|---|
| 5,177,641 A | * | 1/1993 | Kobayashi et al. ......... 359/820 |
| 5,604,555 A | * | 2/1997 | Soshi et al. .................. 396/440 |
| 5,614,763 A | * | 3/1997 | Womack ...................... 257/747 |
| 6,180,948 B1 | * | 1/2001 | Gutekunst et al. ........ 250/458.1 |
| 6,337,736 B1 | * | 1/2002 | Sugiyama et al. .......... 356/3.14 |
| 6,392,703 B1 | * | 5/2002 | Uchino et al. .............. 348/373 |
| 6,404,939 B1 | * | 6/2002 | Wada .......................... 382/312 |
| 6,594,037 B1 | * | 7/2003 | Takahashi ................... 358/474 |

FOREIGN PATENT DOCUMENTS

JP    10-253871    9/1998

* cited by examiner

*Primary Examiner*—Vivek Srivastava
*Assistant Examiner*—Justin Misleh
(74) *Attorney, Agent, or Firm*—Fitzpatrick, Cella, Harper & Scinto

(57) ABSTRACT

This invention has building members which include an image sensing portion, an optical member for forming a beam from an object to be sensed into an image on the image sensing portion, a positioning portion which positions the optical member, and a support member which holds the optical member and to which the positioning portion is fixed. When the optical member deforms along the optical axis upon a temperature change of the building members, the image sensing portion is deformed in the same direction as deformation of the optical member. The position of the image sensing portion is adjusted via a plurality of adjustment members movably attached to the support member. The image sensing portion is fixed to the support member after adjustment by adhering the image sensing portion and the adjustment members to each other, and adhering the adjustment members and the support member to each other.

7 Claims, 18 Drawing Sheets

F I G. 12
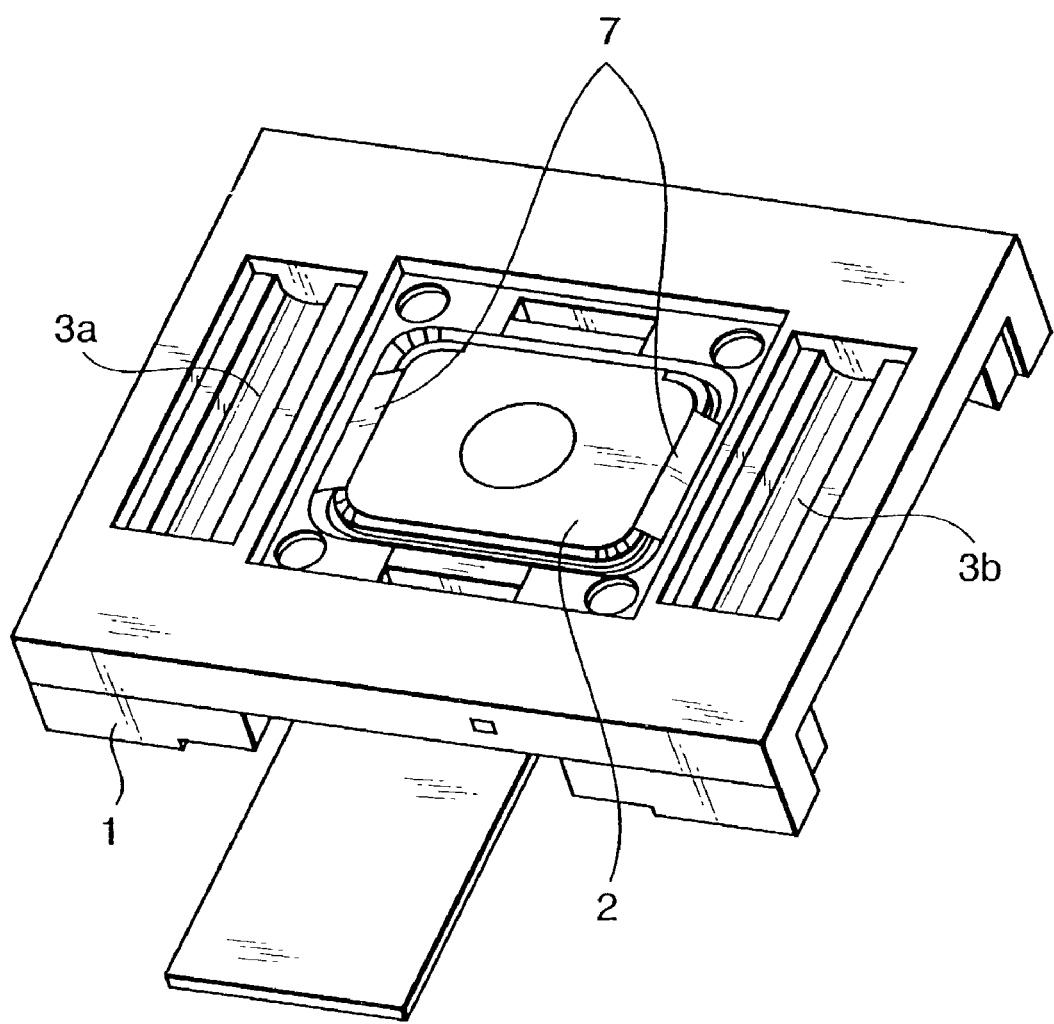

IMAGE SENSING APPARATUS HAVING A MEMBER THAT ADJUSTS WITH TEMPERATURE CHANGE

FIELD OF THE INVENTION

The present invention relates to an image sensing apparatus having an image sensing element with a compensation structure for defocus caused by an external factor such as a temperature change.

BACKGROUND OF THE INVENTION

Japanese Patent Laid-Open No. 10-253871 discloses a focus detection apparatus as a conventional method of adjusting and fixing an image sensing element. The arrangement of this apparatus is shown in FIG. 18. The apparatus has a light-receiving element 111 on which an object image is projected via an imaging lens 110, and a sensor holding member 112 which holds the light-receiving element 111. By rotating and moving the light-receiving element 111 on the sensor holding member 112, the inclination around the optical axis (along the first axis) can be adjusted. By translating the light-receiving element 111 on the sensor holding member 112, shifts along second and third axes perpendicular to each other on a plane almost perpendicular to the optical axis of the imaging lens 110 can be adjusted.

The sensor holding member 112 is equipped with adjusters 113 which are able to move in parallel with the first axis and have hinges 113a for rotatably attaching the adjusters 113 to the sensor holding member 112. Each adjuster 113 is reciprocally attached to a holder 114 so as to be almost parallel to the first axis. Notches 112a are brought into contact with the hinges 113a to rotatably attach the sensor holding member 112, and an inclination around the second axis can be adjusted in the light-receiving element 111. At least one of the adjusters 113 is reciprocated along the optical axis, and the light-receiving element 111 can adjust an inclination around the third axis. In addition, the adjusters 113 are reciprocated with respect to the holder 114 by almost the same amount, and a shift along the first axis can be adjusted. This realizes adjustment of a total of six axes, i.e., along and around the first, second, and third axes.

After adjustment of the six axes is performed by the above mechanism, the light-receiving element 111 and sensor holding member 112, the sensor holding member 112 and adjusters 113, and the adjusters 113 and holder 114 are adhered to each other. As a result, the light-receiving element 111 is fixed to the holder 114.

The conventional method adopts an arrangement in which even a temperature change of a building member hardly causes a positional change of the light-receiving element 111. To cope with this, the optical member itself must hardly change in position. However, if the imaging lens 110 is made of a plastic in the conventional arrangement, a temperature change causes a positional shift due to a large linear expansion coefficient (see Table 1).

TABLE 1

| Part Name | Material | Linear Expansion Coefficient ($\times 10^5$ mm/° C.) | Flexural Elastic Modulus ($\times 10^4$ N/mm) |
|---|---|---|---|
| Support Member | Plastic | 1.500 | 2.43 |
| Image Sensing Element | Metal | 0.260 | 7.00 |
| Cover Glass | Glass | 0.378 | 8.60 |
| Photographing Lens | Plastic | 7.000 | 0.24 |
| Cap Glass | Glass | 0.810 | 7.15 |
| Adjustment Member | Metal | 0.860 | 11.00 |
| Silicon-Based Adhesive | Resin | 5.000 | 0.0002 |
| Instant Adhesive | Cyanoacrylate | 13.000 | 0.0421 |

To prevent this, glass is used to decrease the linear expansion coefficient of the imaging lens 110, satisfying the performance. However, the glass is expensive, so the performance must be satisfied using a plastic lens for cost reduction of the apparatus.

SUMMARY OF THE INVENTION

The present invention has been made in consideration of the above situation, and has as its object to provide an image sensing apparatus which always ensures appropriate image sensing performance.

To solve the conventional problems and achieve the above object, according to the first aspect, an image sensing apparatus of the present invention comprises the following arrangement.

That is, there is provided an image sensing apparatus comprising a building member including an image sensing portion, and an optical member for forming a beam from an object to be sensed into an image on the image sensing portion, wherein when the optical member deforms along an optical axis, the image sensing portion is deformed in the same direction as deformation of the optical member.

According to the second aspect, an image sensing apparatus of the present invention comprises the following arrangement.

That is, there is provided an image sensing apparatus comprising a building member including an image sensing portion, and an optical member for forming a beam from an object to be sensed into an image on the image sensing portion, wherein when the image sensing portion deforms along an optical axis, the optical member is deformed in the same direction as deformation of the image sensing portion.

The present invention employs a means for deforming the image sensing portion in the same direction as deformation of the optical member. Even if the optical member readily deforms, the image sensing portion deforms in the same direction. A change in distance between the optical member and the image sensing portion can be decreased, i.e., defocus can be reduced.

The adjustment members and the support member are in contact with each other at a plurality of contact portions, and an adhesion state is changed in adhering the plurality of contact portions. This can control the deformation amount of the image sensing portion along the optical axis.

The adhesion state of a close contact portion is changed from the adhesion state of a contact portion apart from the optical axis of the optical member in adhering the contact portions. The image sensing portion can deform in the same direction as deformation of the optical member along the optical axis.

Defocus can also be reduced by setting a portion which deforms the optical member in the same direction as deformation of the image sensing portion when the image sensing portion deforms along the optical axis upon a temperature change of the building member.

In addition, the optical member is larger in linear expansion coefficient than the support member, and the support member is larger in linear expansion coefficient than the image sensing portion. This arrangement can make deformation directions along the optical axis coincide with each other.

The adjustment members and the support member are held in contact with each other at a plurality of contact portions, and some of the plurality of contact portions are adhered while the remaining contact portions are not adhered in adhering the plurality of contact portions. The adhesion state can be easily changed.

The adjustment members and the support member are in contact with each other at a plurality of contact portions, and a material of an adhesive is changed in adhering the plurality of contact portions. By combining adhesives, the material can be relatively easily changed to easily control deformation.

The plurality of adjustment members are arranged on two sides via the optical axis of the optical member, the plurality of contact portions are set at different distances from the optical axis of the optical member, and a contact portion apart from the optical axis of the optical member is adhered while a close contact portion is not adhered in adhering the contact portions. The optical member and the image sensing portion can be deformed in the same direction along the optical axis.

The plurality of adjustment members are arranged on two sides via the optical axis of the optical member, the plurality of contact portions are set at different distances from the optical axis of the optical member, and adhesives for a contact portion apart from the optical axis of the optical member and a close contact portion have different materials in adhering the contact portions. Deformation directions along the optical axis can be made to coincide with each other, and the deformation amount can be controlled. A change in interval between the photographing lens and the image sensing element upon a temperature change can be almost eliminated.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 12 is a perspective view showing the adhesion state of the photographing lens according to the embodiment of the present invention;

DETAILED DESCRIPTION OF THE PREFERRED EMBODIMENTS

Preferred embodiments of the present invention will be described below with reference to the accompanying drawings.

(First Embodiment)

Figure 1:
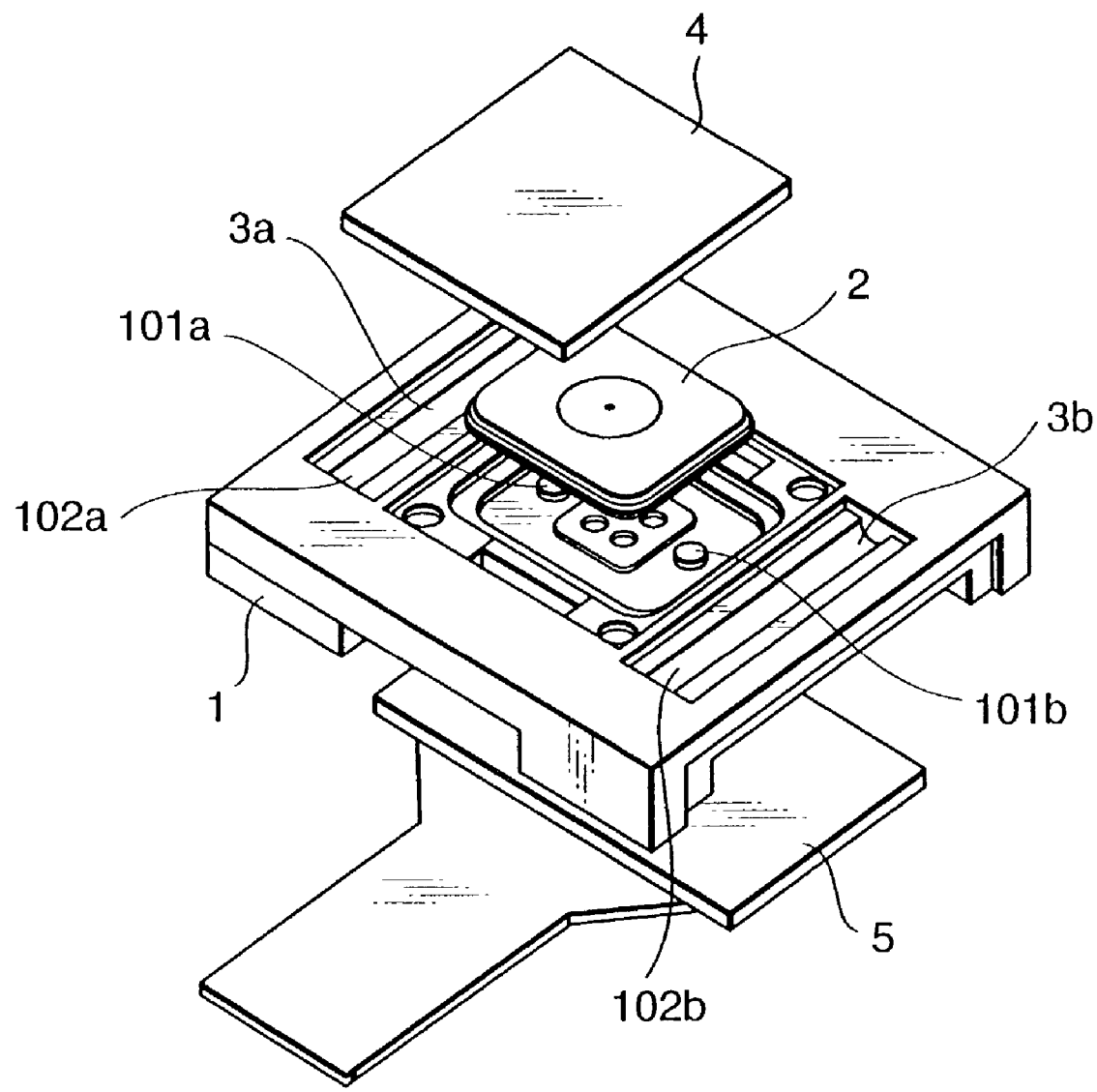
FIG. 1 is an exploded perspective view showing the first embodiment of the present invention (when viewed from above)
Figure 2:
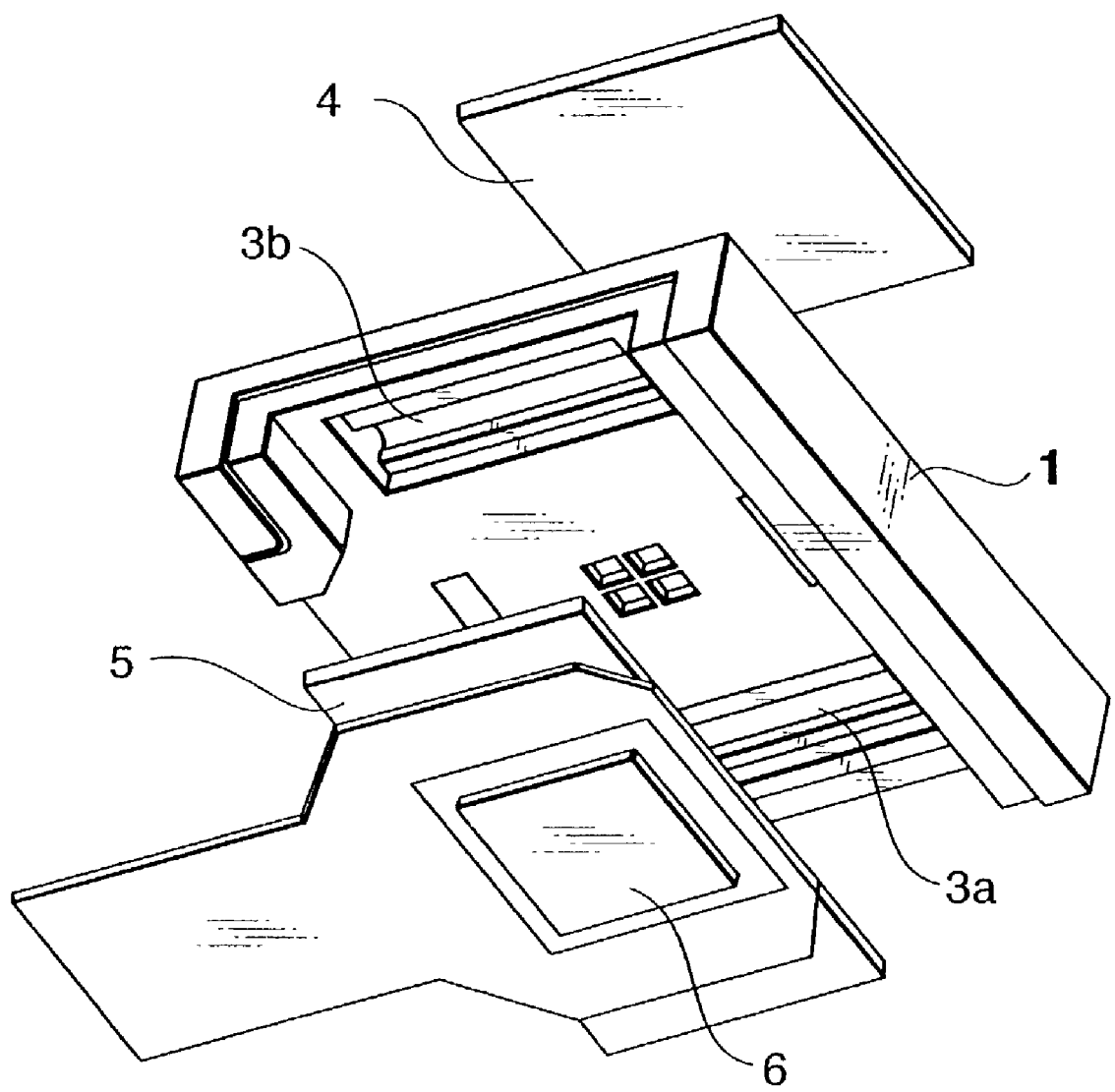
FIG. 2 is an exploded perspective view showing the first embodiment of the present invention (when viewed from below)
Figure 3:
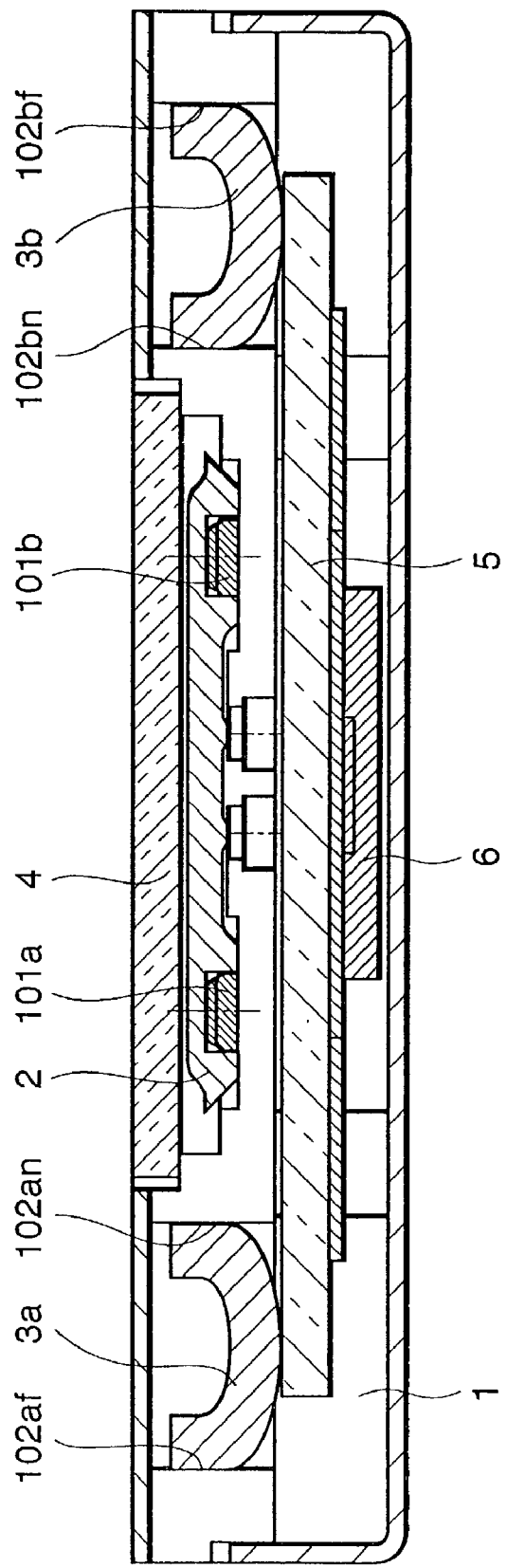
FIG. 3 is a sectional view showing the first embodiment of the present invention.

FIGS. 1 to 3 show a first embodiment of the present invention. FIGS. 1 and 2 are exploded perspective views of an image sensing apparatus according to the present invention exploded along the optical axis when viewed from the lens side and the image sensing side, respectively. Reference numeral 1 denotes a support member which holds an optical member and image sensing portion and shields external light; 2, a photographing lens which converges a beam from an object to be sensed into a focus on a prospective imaging plane; 3a and 3b, adjustment members which are in contact with the support member 1 and image sensing portion and allows adjusting the position of the image sensing portion with respect to the photographing lens 2; 4, a cover glass for protecting the photographing lens 2; 5, a cap glass for protecting the image sensing portion; and 6, an image sensing element serving as an image sensing portion for sensing an image. The adjustment members 3a and 3b are respectively fitted in the hole portions 102a and 102b formed in the support member 1.

Figure 9:
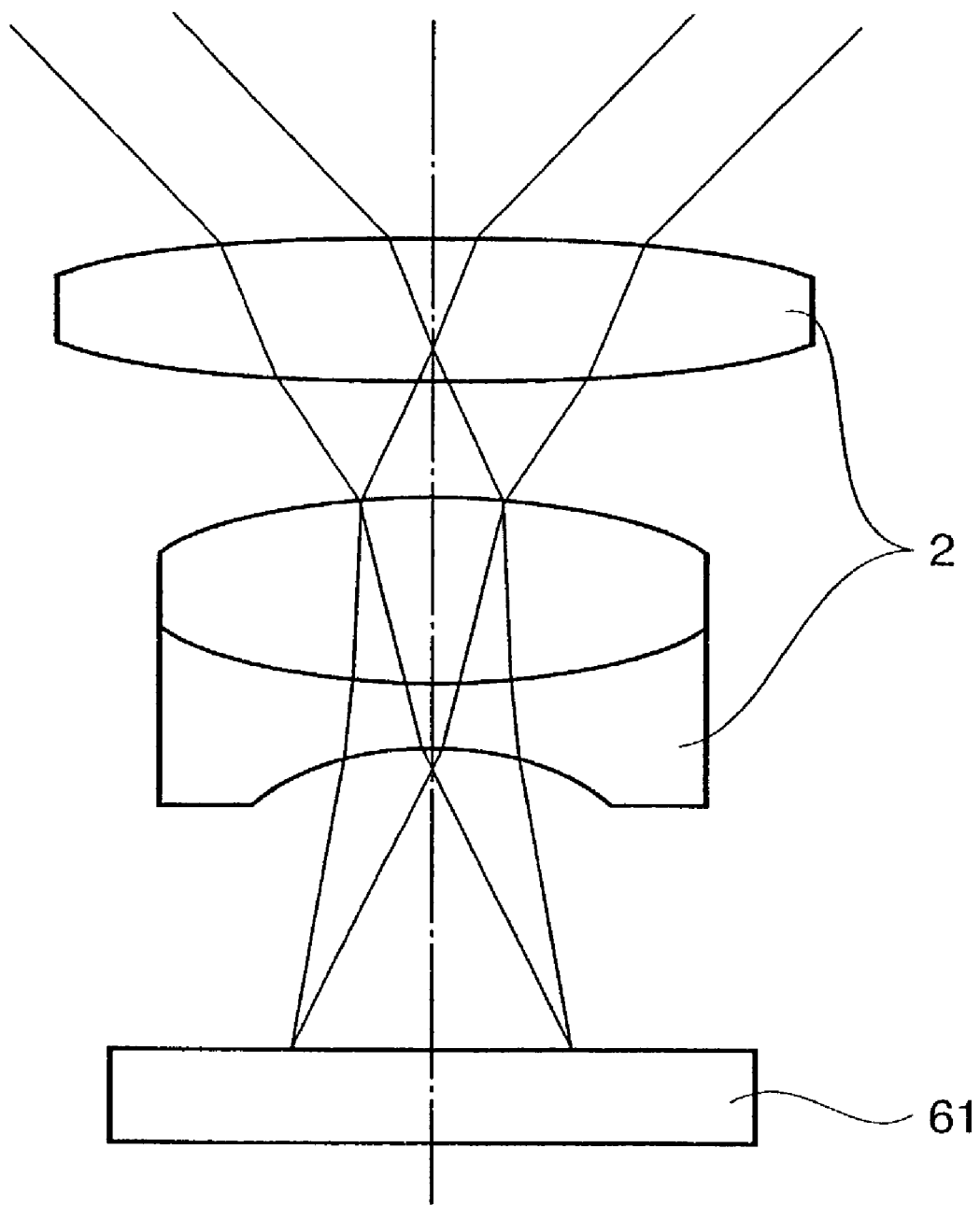
FIG. 9 is a schematic view showing the schematic arrangement of the image sensing element.

FIG. 9 shows the schematic arrangement of the image sensing apparatus according to the first embodiment. An image of an object to be sensed is formed on an image sensing element 61 via the photographing lens group of the photographing lens 2. This image is sensed by the image sensing element 61 to obtain an image.

Figure 10:
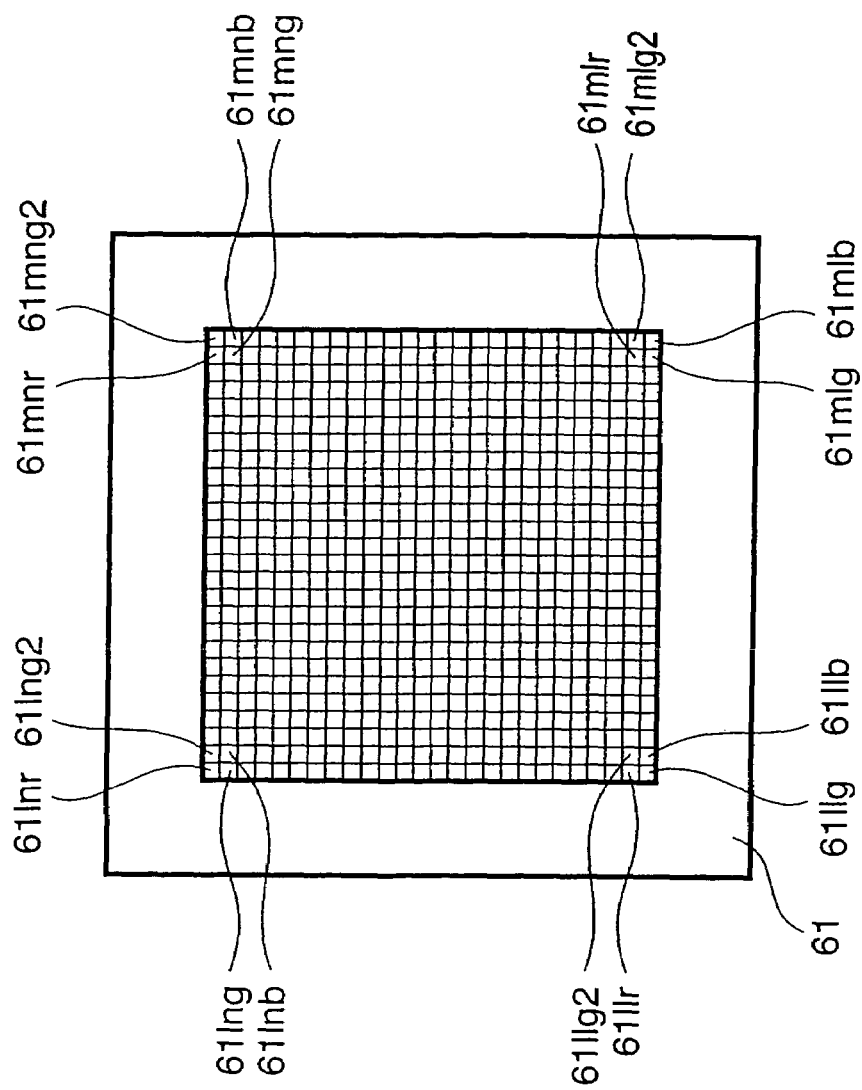
FIG. 10 is a plan view showing another structure of the image sensing element.

The image sensing element 61 has a structure as shown in FIG. 10. In FIG. 10, reference numeral 61mng denotes a first green pixel; 61mnb, a blue pixel; 61mnr, a red pixel; and 61mng2, a second green pixel. Note that groupings of four pixels extended in rows from l to m, in the direction from left to right, and in columns l to n, in the direction from bottom to top. According, the four-pixel group at the lower left is 16llg, 61llb, 61llr, and 61llg2; at the upper left the group is 61ng, 61lnb, 61lnr, and 61lng2; and at the lower right the group is 61mlg, 61mlb, 61mlr, and 61mlg2. These pixels are regularly arrayed into a generally called Bayer array, as shown in FIG. 10.

This pixel array has green pixels double in number the blue or red pixels. In principle, pixels of three colors equal in number can form a color image. By increasing the number of green pixels for relatively high visual sensitivity, the image quality can be increased. Thus, an image sensing element with the Bayer array is often employed.

Figure 4:
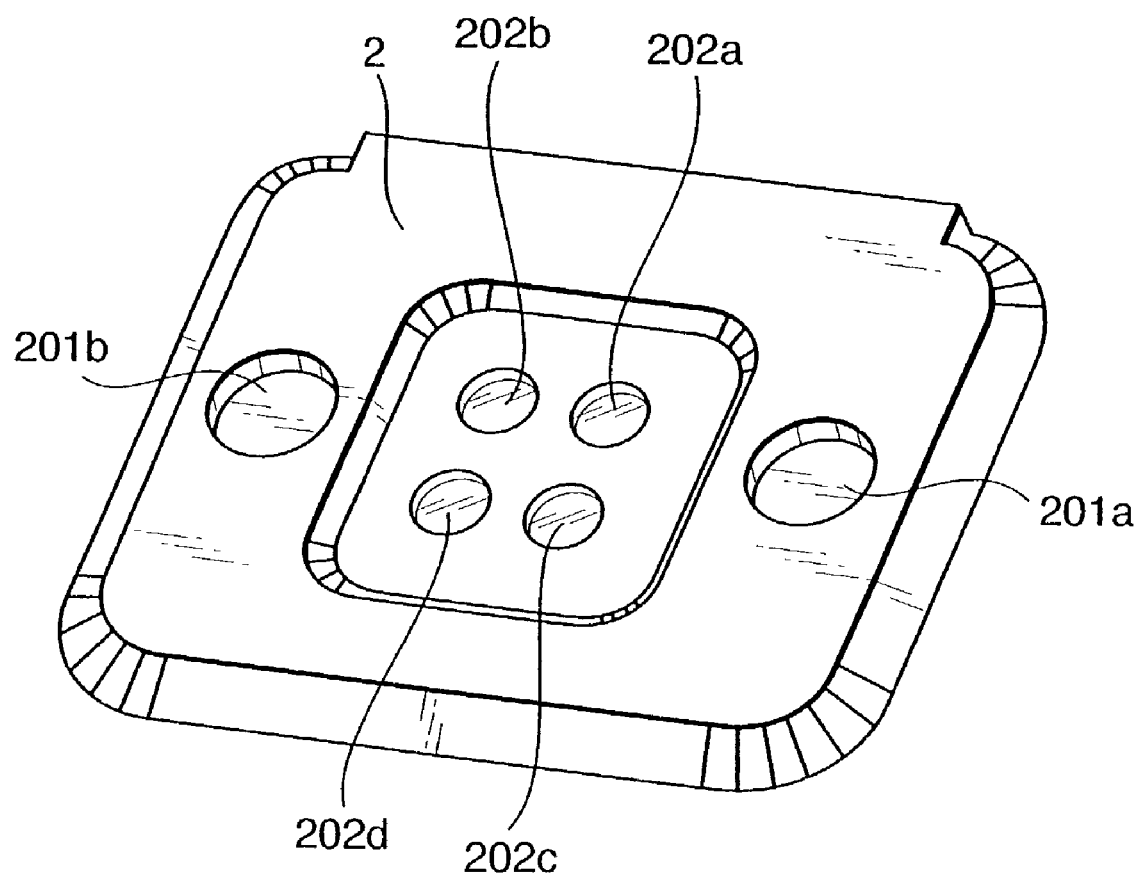
FIG. 4 is a view showing a photographing lens according to the present invention.
Figure 6:
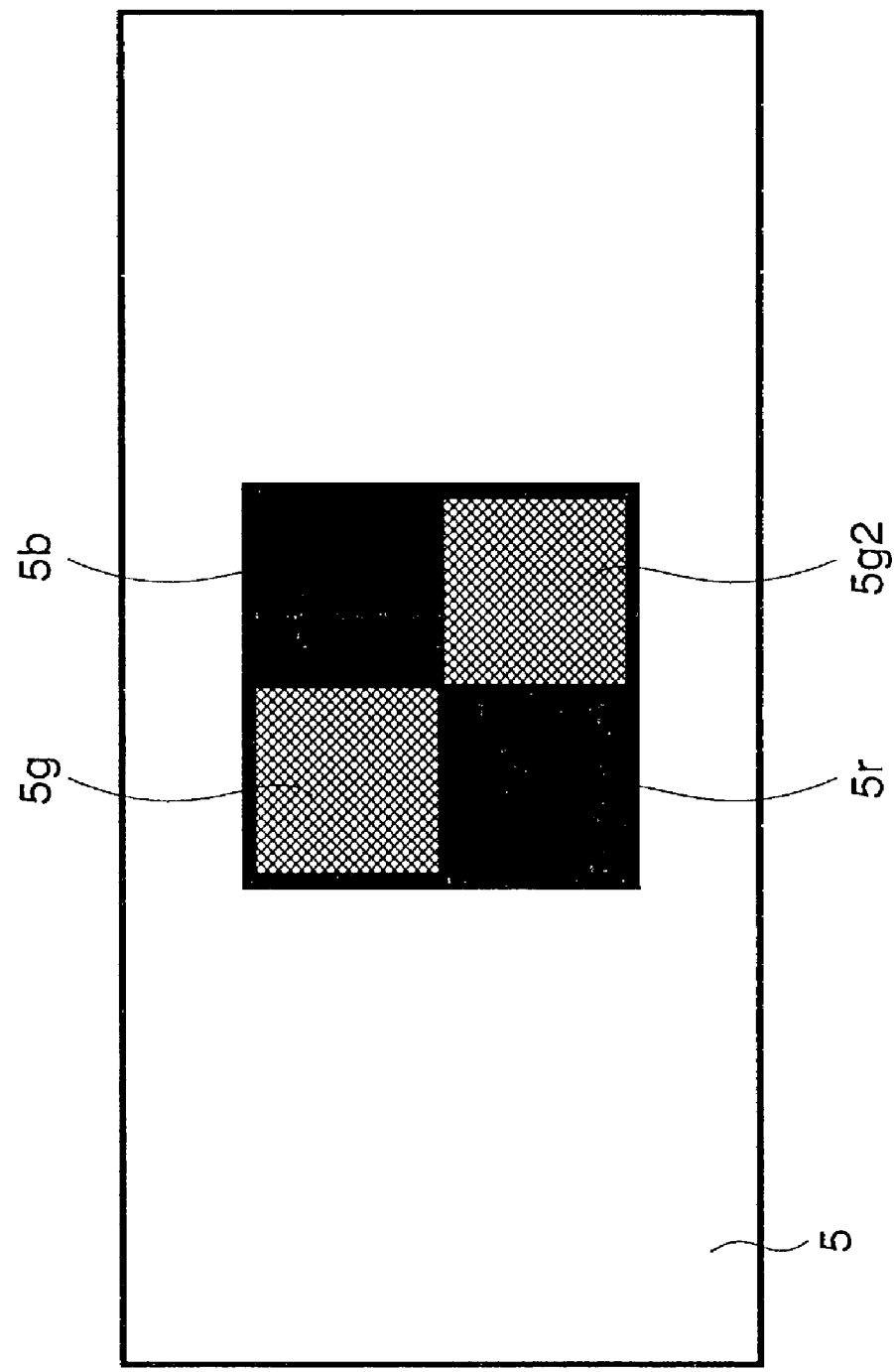
FIG. 6 is a plan view showing a cap glass according to the present invention.

The image sensing principle of the image sensing apparatus according to the present invention will be explained. As shown in FIG. 4, the photographing lens 2 has four lens portions 202a to 202d. Attention is given to only the lens portion 202a. A beam from an object to be sensed travels to the cap glass 5 via the lens portion 202a. As shown in FIG. 6, the cap glass 5 has color filters of three, R, G, and B colors. Reference numeral 5g denotes a first green region; 5b, a blue region; 5r, a red region; and 5g2, a second green region. The beam having passed through the lens portion 202a passes through a first green region 5g. The beam having passed through the cap glass 5 is projected on the image sensing region 60g in the image sensing element 6.

Figure 5:
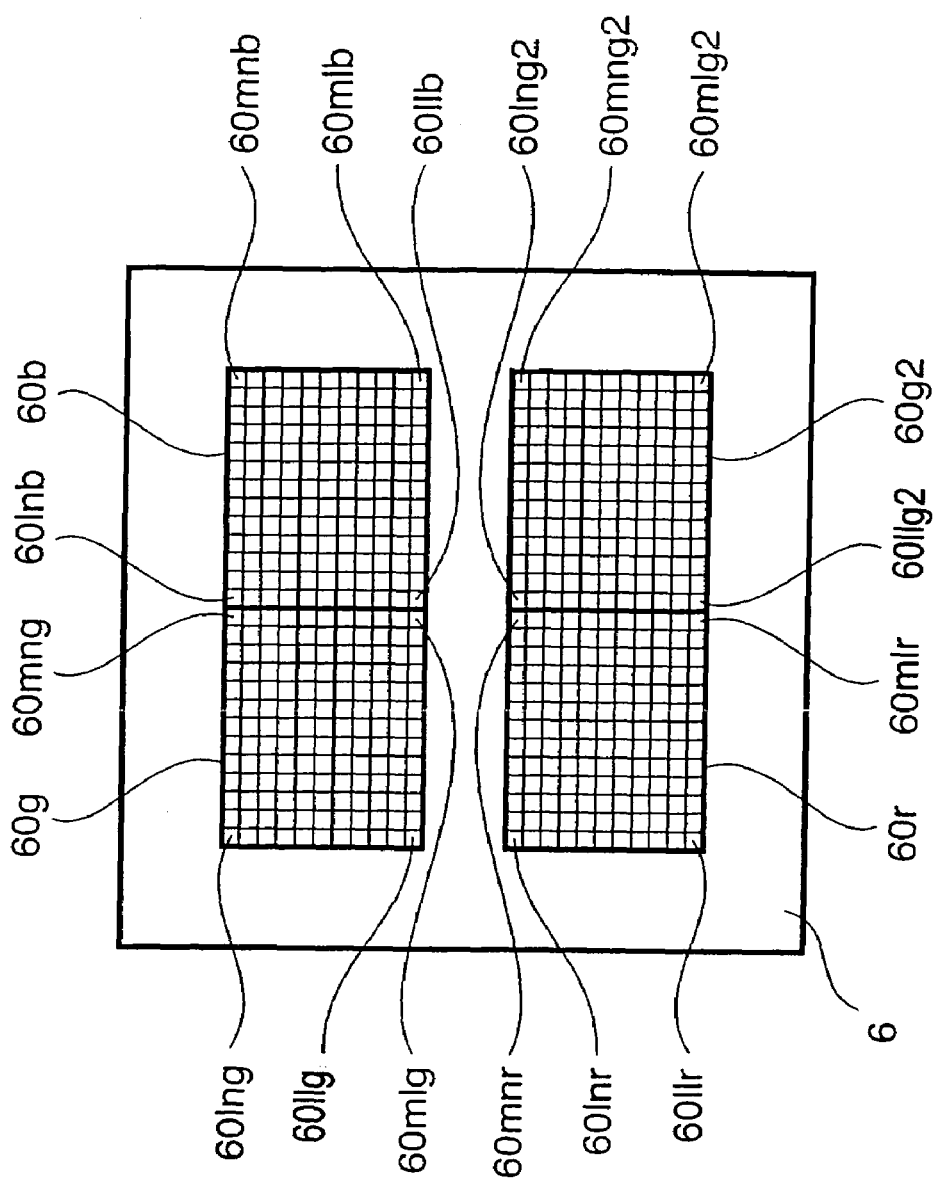
FIG. 5 is a plan view showing the structure of an image sensing element according to the present invention.

As shown in FIG. 5, the image sensing element 6 has four image sensing regions 60g, 60b, 60r, and 60g2. A beam having passed through the lens portion 202a forms an image on the image sensing region 60g. Similarly, a beam having passed through the lens portion 202b forms an image on the image sensing region 60b via the blue region 5b. A beam having passed through the lens portion 202c forms an image on the image sensing region 60r via the red region 5r. A beam having passed through the lens portion 202d forms an image on the image sensing region 60g2 via the second green region 5g2. The pixel designations in FIG. 5 extend from l to m when moving from left to right for each color, and from l to n when moving from bottom to top. According, the upper left pixels are 60lnr, 60lng2, 60lng, and 60lnb; the lower left are 60llr, 60llg2, 60llg, and 60llb; the upper right are 60mnr, 60mng2, 60mng, and 60mnb; and the lower right are 60mlr, 60mlg2, 60mlg, and 60mlb.

The obtained four images are synthesized into one color image. In this case, the shapes of the four lens portions 202a to 202d are slightly differed from each other to shift the four images by half the pixel.

Figure 7:
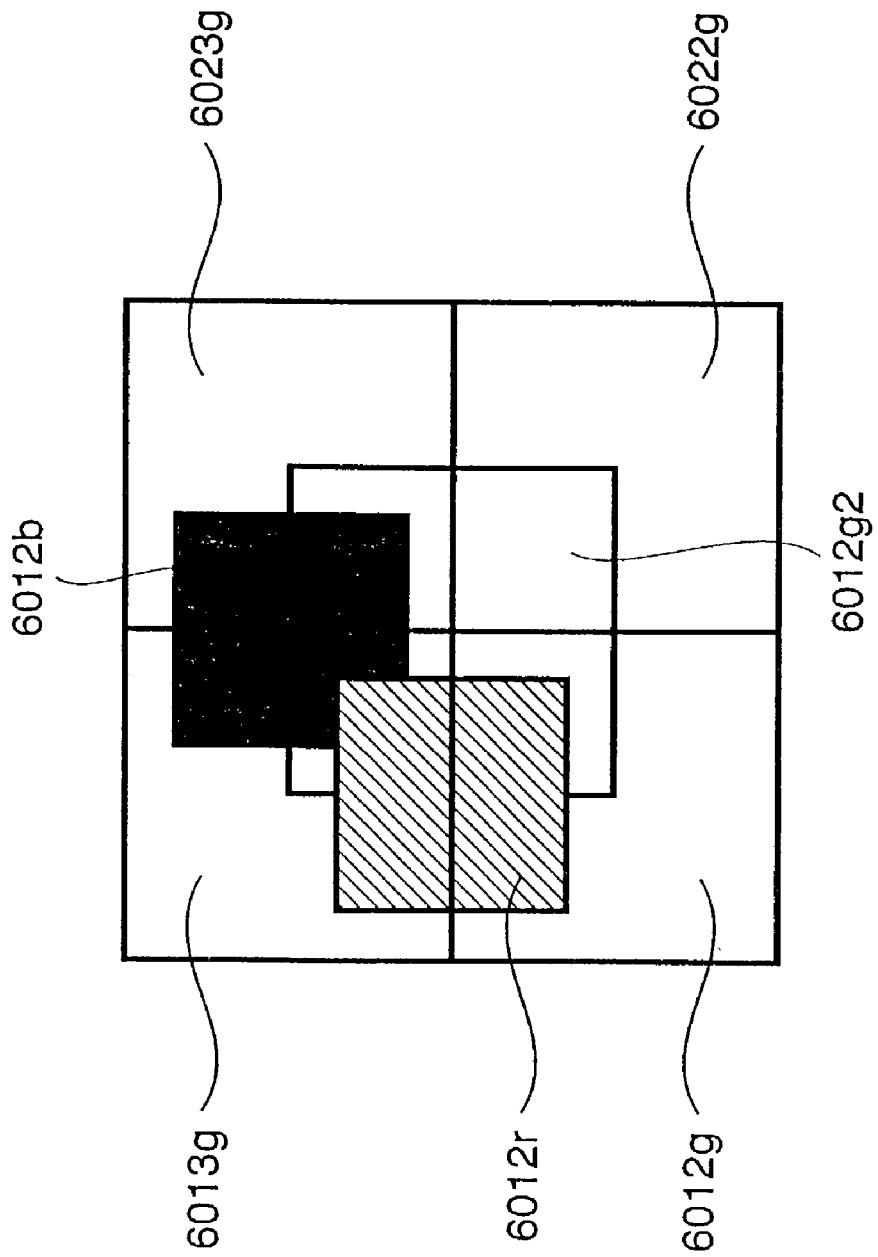
FIG. 7 is a plan view showing a pixel array in image synthesis according to the embodiment of the present invention.
Figure 8:
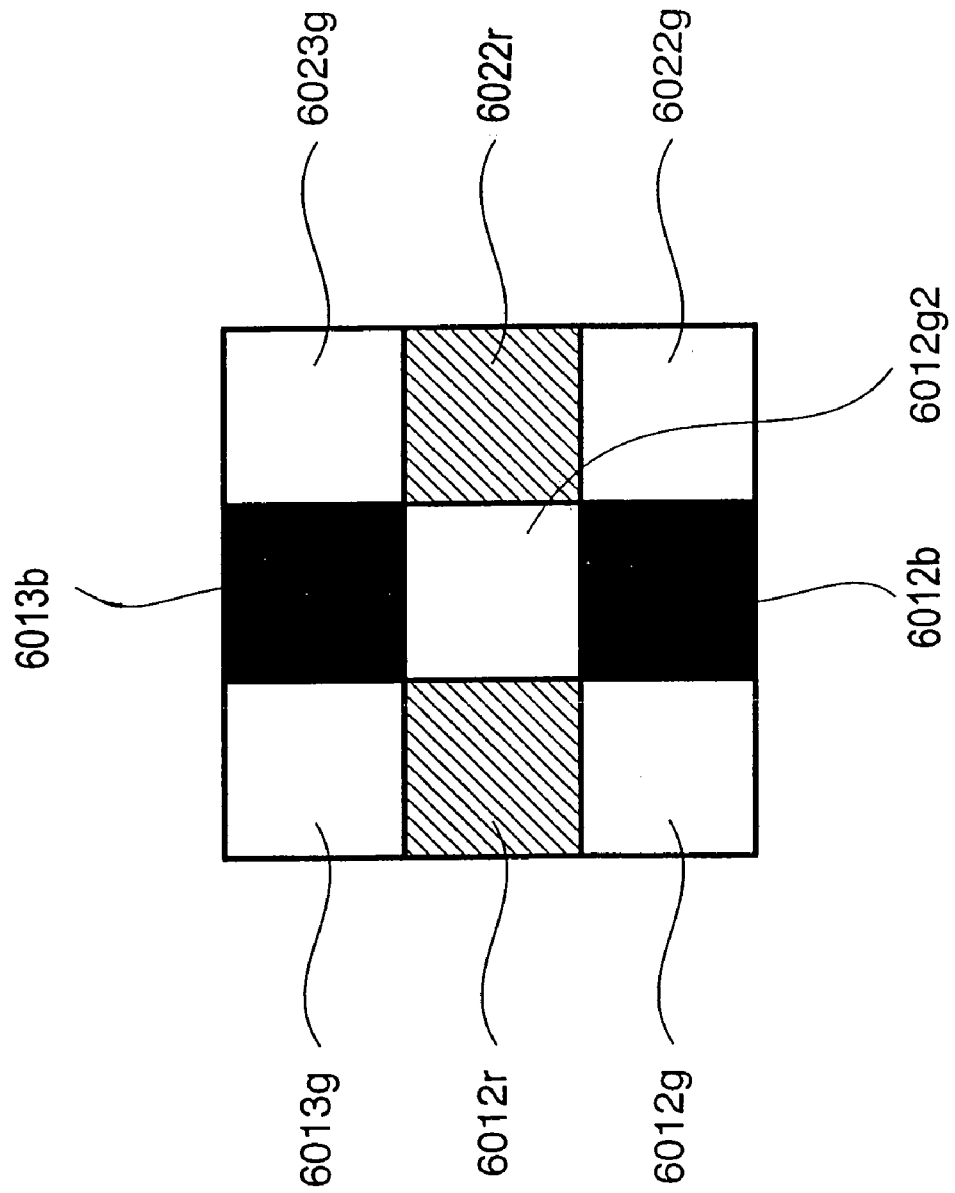
FIG. 8 is a plan view showing an apparent pixel array in image synthesis according to the embodiment of the present invention.

FIG. 7 shows a state in which pixels of the respective colors are extracted and made to overlap each other. For illustrative convenience, pixel sizes are different. In practice, pixels have almost the same size and shape. Assuming a first green pixel 6013g as a center, a blue pixel 6012b shifts right by ½ the pixel, and a red pixel 6012r shifts down by ½ the pixel. A second green pixel 6012g2 shifts right and down by ½ the pixel each. That is, the red pixel 6012r is inserted between first green pixels 6012g and 6013g, and the blue pixel 6012b is inserted between first green pixels 6013g and 6023g. The second green pixel 6012g 2 is inserted at the contact between first green pixels 6012g, 6022g, 6013g, and 6023g. This looks like a pixel array as shown in FIG. 8, and an image equivalent to an image on the image sensing element with the Bayer array as shown in FIG. 10 can be obtained.

Adjustment of the image sensing element 6 will be explained. As described above, four images of three colors are attained by the four image sensing regions. These four images are made to overlap each other into one image. In this case, if the positions of the photographing lens 2 and image sensing element 6 greatly change, an image at a target position in overlapping cannot be photographed. To prevent this, the positions of the photographing lens 2 and image sensing element 6 must be sufficiently accurately adjusted.

The image sensing element 6 is adjusted along a total of six axes against shifts in three axial directions along the optical axis (first axis) and two axes (second and third axes) perpendicular to each other on a plane perpendicular to the optical axis, and against shifts in rotational directions around the first, second, and third axes. The adjustment mechanism will be described with reference to the sectional views of FIGS. 3 and 11. The image sensing element 6 is adhered and fixed to the cap glass 5 to form an image sensing module. The cap glass 5 is in contact with adjustment members 3a and 3b, and is not fixed before adjustment. The image sensing element 6 can, therefore, be adjusted against shifts along the horizontal axis (second axis) and the axis (third axis) perpendicular to the sheet surface. Also, the image sensing element 6 can be adjusted in the rotational direction around the optical axis (first axis).

The adjustment members 3a and 3b are respectively fitted in hole portions 102a and 102b (FIG. 1) formed in the support member 1. The adjustment member 3a is in contact with two side walls 102af and 102an of the hole portion 102a. The adjustment member 3a functions as a guide for slide in the up-and-down direction on the sheet surface. Similarly, the adjustment member 3b is fitted in the hole portion 102b and is in contact with side walls 102bf and 102bn. Vertically moving the adjustment members 3a and 3b by the same amount enables adjustment along the optical axis (first axis). Vertically moving the adjustment members 3a and 3b by different amounts enables adjustment in the rotational direction around the axis (third axis) perpendicular to the sheet surface in FIG. 3.

Figure 11:
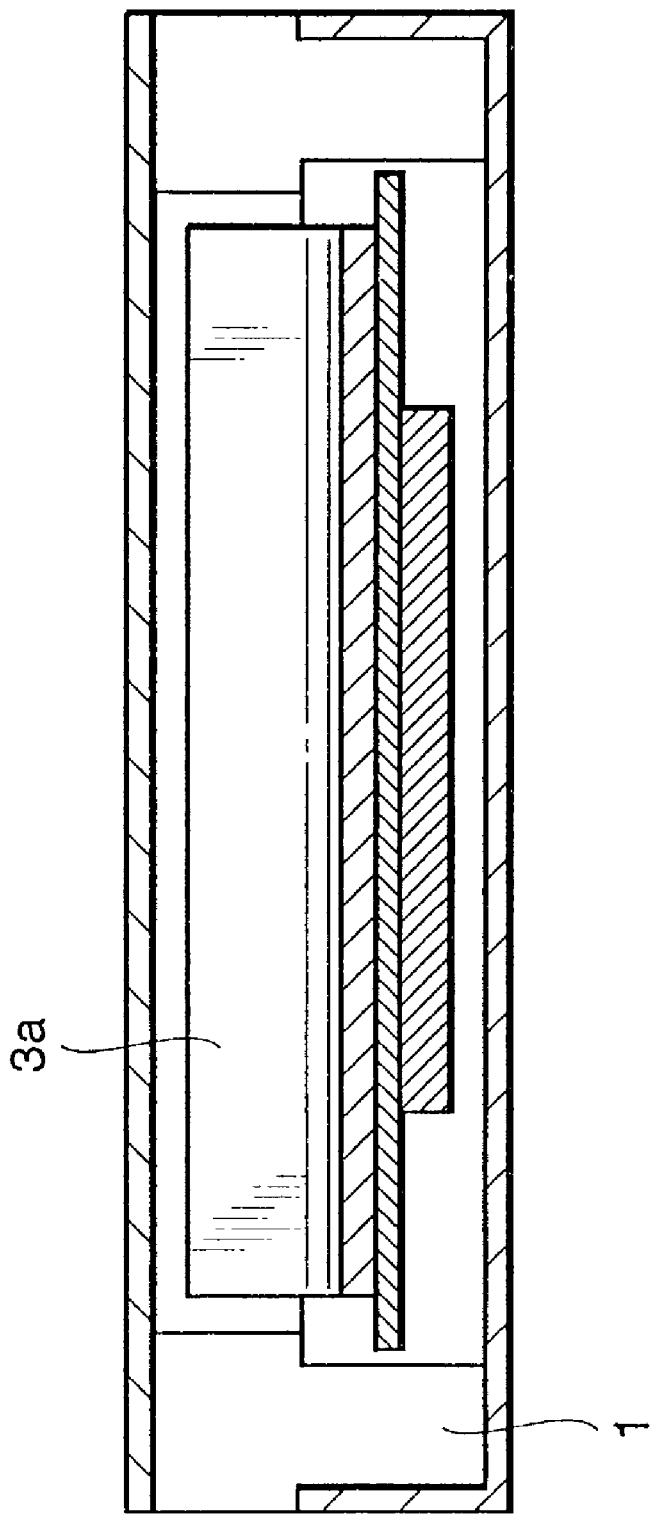
FIG. 11 is a sectional view showing the layout of an adjustment member according to the embodiment of the present invention.

As shown in FIG. 11, the adjustment member 3a is not fitted in the longitudinal direction, and the longitudinal size of the of the hole portion 102a is much larger than the size of the adjustment member 3a. This also applies to the adjustment member 3b. The adjustment member 3a can rotate about and move along the axis (second axis) perpendicular to the sheet surface in FIG. 11, and allows adjusting the image sensing element 6 about and along the second axis. With this mechanism, the image sensing element 6 can be adjusted for the six axes, and its position is adjusted with respect to the photographing lens 2. After that, the contacts between the cap glass 5 and the adjustment members 3a and 3b are adhered to fix the support member 1 and image sensing module. Of the contacts between the support member 1 and the adjustment members 3a and 3b, the side walls 102af and 102bf as contacts farther from the optical axis of the photographing lens 2 are adhered. As a result, the image sensing module is fixed to the support member 1.

As shown in FIG. 4, the photographing lens 2 has positioning dowel holes 201a and 201b. The positioning dowel hole 201a is an elongated hole, whereas the positioning dowel hole 201b is a fitting hole. In correspondence with them, the support member 1 has positioning dowels 101a and 101b. The positioning dowel 101a is fitted in the positioning dowel hole 201a, and the positioning dowel 101b is fitted in the positioning dowel hole 201b, thereby positioning the photographing lens 2 with respect to the support member 1. As shown in FIG. 12, the support member 1 and photographing lens 2 are fixed with an adhesive 7. In this case, the adhesive is one having a relatively low elastic modulus (silicone-based adhesive or the like) in order to release the influence of deformation of the support member 1.

Figure 13:
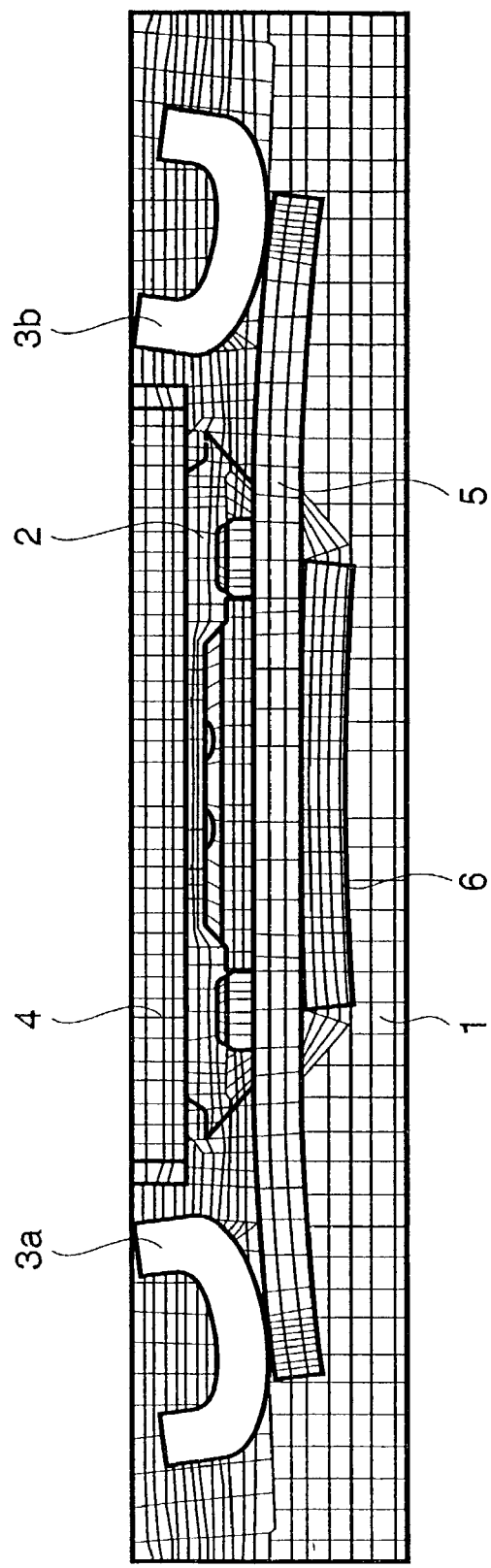
FIG. 13 is a sectional view showing a deformed state obtained by a thermal deformation simulation according to the embodiment of the present invention.

FIG. 13 shows a deformed state upon a temperature change in the image sensing apparatus having the above arrangement. This deformed state is a result of conducting thermal deformation analysis using a finite element method for the image sensing apparatus having the above-described structure. The properties of respective building members are shown in Table 1. As for the temperature condition, components are assembled at room temperature, and the temperature is increased up to 70° C. to obtain a deformed state. Since the deformation amount by thermal deformation analysis is very small, only the deformation amount is magnified by 50 times in views (FIGS. 13 and 14) showing the deformed state.

Figure 14:
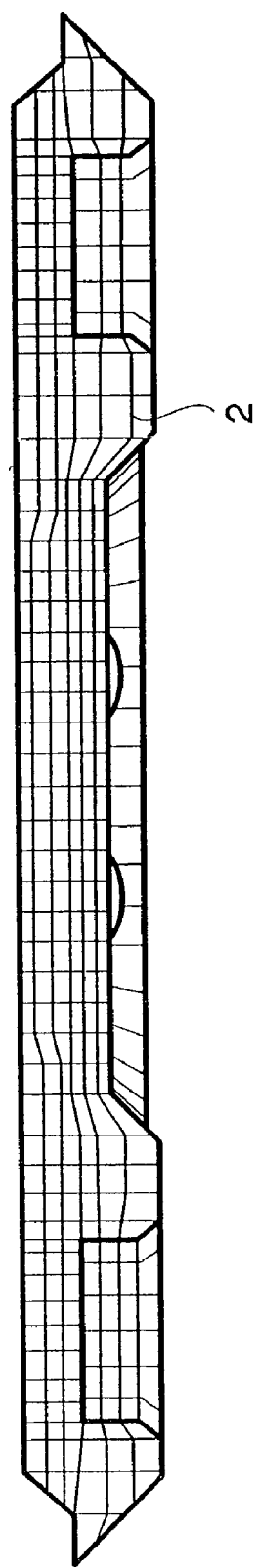
FIG. 14 is a view showing the deformed state of the photographing lens obtained by the thermal deformation simulation according to the embodiment of the present invention.

FIG. 14 shows only the photographing lens 2. From a comparison in linear expansion coefficient between the support member 1 and the photographing lens 2, the photographing lens 2 having a much larger linear expansion coefficient tends to extend more than the support member 1. However, the photographing lens 2 is pressed by adhesion, and its longitudinal extension is restricted, resulting in a deformed state in which the center of the photographing lens 2 expands. Hence, the photographing lens 2 moves apart from the image sensing element 6.

As for the image sensing element 6, the cap glass 5 and image sensing element 6 have small linear coefficients and large elastic moduli, and relatively hardly deform. If four surfaces, i.e., the side walls 102af and 102an serving as surfaces in contact with the adjustment member 3a and the side walls 102bf and 102bn serving as surfaces in contact with the adjustment member 3b are firmly fixed, the image sensing element 6 acts to suppress its deformation and hardly moves even upon deformation of the support member 1. The photographing lens 2 moves apart from the image sensing element 6, as described above. The interval between them increases, causing defocus. To prevent this, when the image sensing portion is to be fixed, the adjustment members 3a and 3b are adhered to only the side walls 102af and 102bf so as to easily move. The image sensing element 6 deforms toward the photographing lens 2 in response to deformation of the support member 1, as shown in FIG. 13. The deformation amount of the photographing lens 2 and that of the image sensing portion cancel each other, hardly causing defocus.

The image sensing portion may deform more than the deformation amount of the photographing lens 2 depending on conditions such as the material of the image sensing apparatus. To the contrary, the interval between the photographing lens 2 and the image sensing element 6 decreases to generate defocus. In this case, the side wall 102an as a surface in contact with the adjustment member 3a and the side wall 102bn as a surface in contact with the adjustment member 3b are also fixed. At this time, the side walls 102an and 102bn are fixed at a much smaller adhesive strength in comparison with adhesion of the side walls 102af and 102bf. This setting can decrease the deformation amount though the image sensing element 6 deforms toward the photographing lens 2, similar to adhesion of only the side walls 102af and 102bf. In this manner, the interval between the photographing lens 2 and the image sensing element 6 can be controlled.

The first embodiment has exemplified an image sensing apparatus for sensing an object image. Even the above-mentioned conventional focus detection apparatus can attain the temperature compensation effect by the same arrangement. The same effects can also be obtained when the image sensing apparatus is adopted as a contrast detection focus detection apparatus not for sensing an image but for detecting the contrast to detect the focus.

(Second Embodiment)

The second embodiment according to the present invention will be described. The same reference numerals as in the first embodiment denote the same parts.

Figure 16:
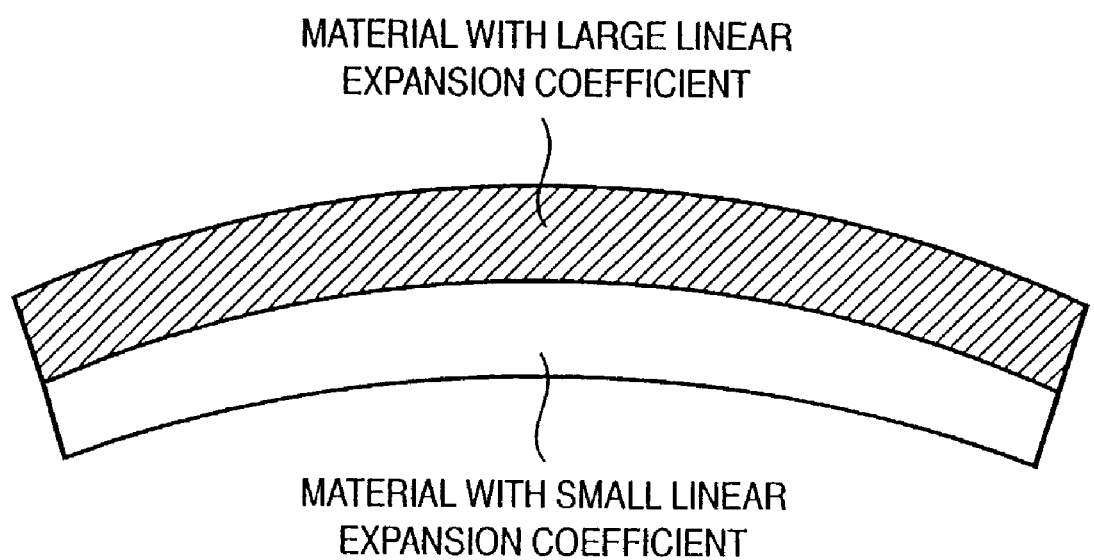
FIG. 16 is a view showing deformation when materials with different linear expansion coefficients are adhered to each other according to the embodiment of the present invention.

As described in the first embodiment, an image sensing module is fixed to a support member 1 via adjustment members 3a and 3b. In this case, if a cap glass 5 and the adjustment members 3a and 3b are adhered to each other, the adjustment member 3a and a side wall 102af serving as a contact surface apart from the optical axis are adhered to each other, and the adjustment member 3b and a side wall 102bf are adhered to each other, an image sensing element 6 deforms toward a photographing lens 2 in response to deformation of the support member 1 upon a temperature change of the member. To keep the interval between the image sensing element 6 and the photographing lens 2 constant, the photographing lens 2 must deform in the same direction (direction in which the photographing lens 2 moves apart from the image sensing element 6 along the optical axis). For this purpose, the photographing lens 2 is fixed to the support member 1 by using a material whose linear expansion coefficient is larger than that of the support member 1. As the temperature of the member rises, the photographing lens 2 tends to extend more than the support member 1, the member warps as shown in FIG. 16.

To the contrary, in the second embodiment, the support member 1 is much larger in size than the photographing lens 2, and is hardly influenced by deformation of the photographing lens 2. Simple adhesion cannot deform the photographing lens 2, either. Considering this, the fitting play of a positioning dowel 101b is eliminated, i.e., the positioning dowel 101b is fitted in a positioning dowel hole 201b of the photographing lens 2 under a low pressure. This allows only the photographing lens 2 to deform similar to the image sensing element 6.

Figure 15A:
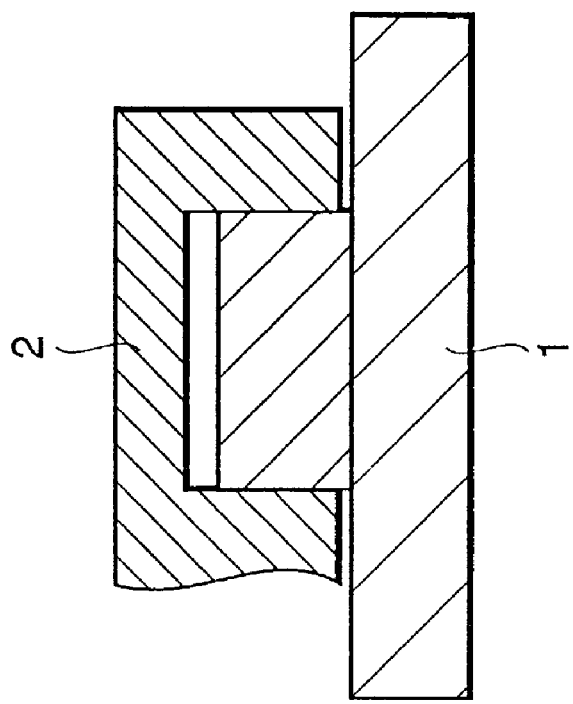
FIGS. 15A and 15B are views showing the second embodiment of the present invention.

In normal fitting, a shaft is formed thinner than a hole, as shown in FIG. 15A. A gap of several μm to several ten μm exists between the shaft and the hole. This gap causes a relative change within it when the support member 1 and photographing lens 2 extend along with a temperature rise of the member. The photographing lens 2 simply extends in the lateral direction (on a plane perpendicular to the optical axis), and does not deform along the optical axis.

Figure 15B:
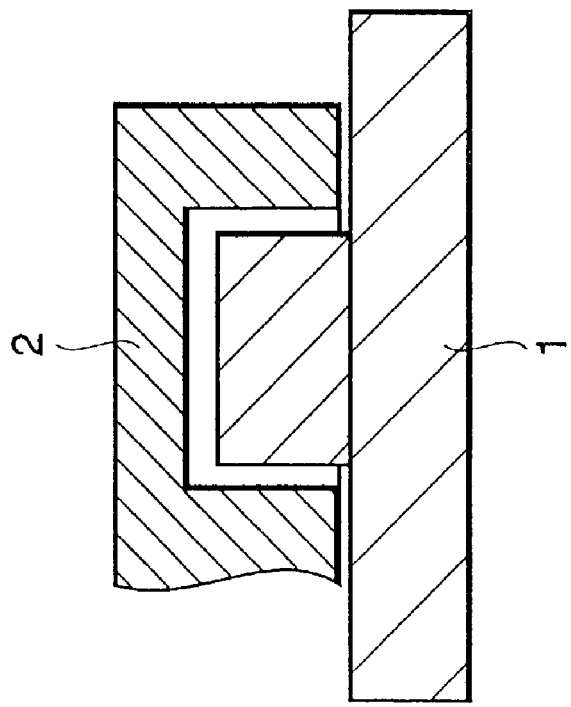

To the contrary, the dowel is fitted under a low pressure to eliminate any fitting play, as shown in FIG. 15B, and only the photographing lens 2 deforms. To facilitate deformation of the photographing lens 2, the photographing lens 2 is fixed to the support member 1 by adhesion using an adhesive with a low elastic modulus described in the first embodiment, as shown in FIG. 12. This can provide a structure free from any gap by devising the fixing method of the photographing lens 2 when the image sensing element 6 deforms along the optical axis.

An embodiment when a solid-state image sensing element according to the present invention is applied to a still camera will be explained.

Figure 17:
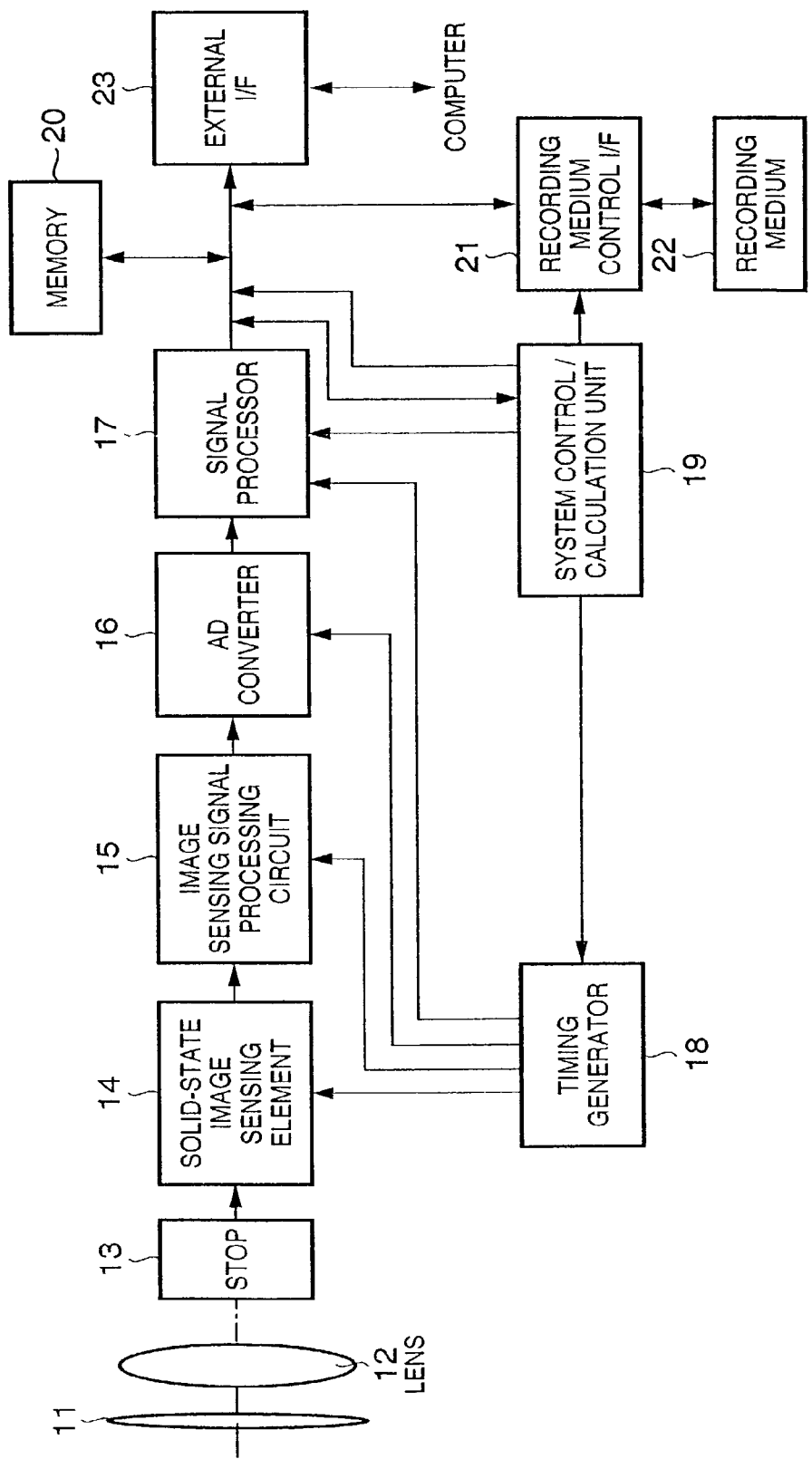
FIG. 17 is a block diagram showing an example of an image sensing system according to the present invention.
Figure 18:
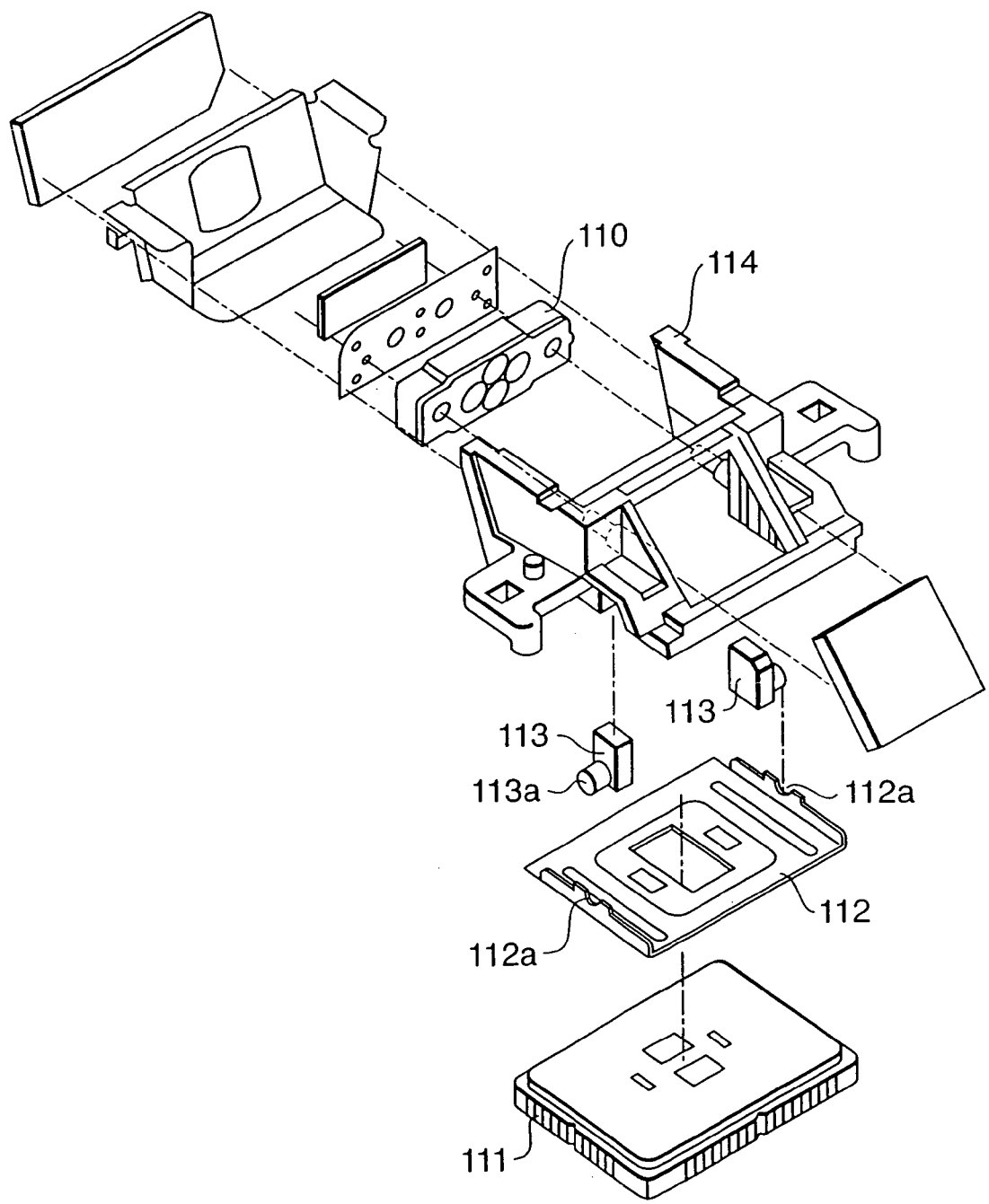
FIG. 18 is an exploded perspective view showing the prior art.

FIG. 17 is a block diagram showing a case in which the solid-state image sensing element of the present invention is applied to a still video camera. In FIG. 17, a barrier 11 serves as protection of a lens 12 and a main switch. The lens 12 forms the optical image of an object on a solid-state image sensing element 14. A stop 13 changes the light quantity having passed through the lens 12. The solid-state image sensing element 14 receives the object image formed on the lens 12 as an image signal. Reference numeral 16 denotes an A/D converter for analog-to-digital-converting the image signal output from the solid-state image sensing element 14; and 17, a signal processor for performing various correction operations for image data output from the A/D converter 16 or compressing the data.

Reference numeral 18 denotes a timing generator for outputting various timing signals to the solid-state image sensing element 14, an image sensing signal processing circuit 15, the A/D converter 16, and the signal processor 17; 19, a system control/calculation unit for performing various calculation operations and controlling the overall still video camera; 20, a memory for temporarily storing image data; 21, a recording medium control interface for recording/reading out data on/from a recording medium; 22, a detachable recording medium such as a semiconductor memory for recording/reading out image data; and 23, an external interface for connecting an external computer or the like.

The photographing operation of the still video camera having the above arrangement will be described.

When the barrier 11 is opened, the main power supply is turned on. Then, the power supply of the control system is turned on, and the power supply of an image sensing system circuit such as the A/D converter 16 is turned on. A signal output from the solid-state image sensing element 14 is converted by the A/D converter 16, and input to the signal processor 17. Based on the data, the system control/calculation unit 19 executes exposure calculation.

The brightness is determined from the photometry result, and the system control/calculation unit 19 controls the shutter speed in accordance with the determination result.

After the end of exposure, an image signal output from the solid-state image sensing element 14 is A/D-converted by the A/D converter 16, and written in the memory 20 by the system control/calculation unit 19 via the signal processor 17. Data accumulated in the memory 20 are recorded on the recording medium 22 via the recording medium control interface 21 under the control of the system control/calculation unit 19. Data may be directly input to a computer or the like to process an image.

As has described above, according the above embodiments, an image sensing apparatus of this type adopts a means for deforming the image sensing portion in the same direction as deformation of the optical member. Even if the optical member deforms, the image sensing portion also deforms in the same direction. A change in distance between the optical member and the image sensing portion can be decreased to reduce defocus. The use of the compensation structure for defocus caused by an external factor such as a temperature change can always ensure proper performance.

The present invention is not limited to the above embodiments and various changes and modifications can be made within the spirit and scope of the present invention. Therefore, to apprise the public of the scope of the present invention the following claims are made.

What is claimed is:

1. An image sensing apparatus comprising a building member including an image sensing portion, and an optical member for forming a beam from an object to be sensed into an image on said image sensing portion, wherein
   when said optical member deforms along an optical axis upon a temperature change of said building member, said image sensing portion is deformed in the same direction as deformation of said optical member,
   said building member includes a positioning portion which positions said optical member, and a support member which holds said optical member and to which said positioning portion is fixed,
   a position of said image sensing portion is adjusted via a plurality of adjustment members movably attached to said support member, and
   said image sensing portion is fixed to said support member after adjustment by adhering said image sensing portion and the adjustment members to each other, and adhering the adjustment members and said support member to each other.

2. The apparatus according to claim 1, wherein
   the adjustment members and said support member are in contact with each other at a plurality of contact portions, and
   an adhesion state is changed in adhering the plurality of contact portions.

3. The apparatus according to claim 2, wherein
   the plurality of adjustment members are arranged on two sides via the optical axis of said optical member,
   the plurality of contact portions are set at different distances from the optical axis of said optical member, and
   the adhesion state of a close contact portion is changed from the adhesion state of a contact portion apart from the optical axis of said optical member in adhering the contact portions.

4. The apparatus according to claim 2, wherein
   the plurality of adjustment members are arranged on two sides via the optical axis of said optical member,
   the plurality of contact portions are set at different distances from the optical axis of said optical member, and
   a contact portion apart from the optical axis of said optical member is adhered while a close contact portion is not adhered in adhering the contact portions.

5. The apparatus according to claim 2, wherein
   the plurality of adjustment members are arranged on two sides via the optical axis of said optical member,
   the plurality of contact portions are set at different distances from the optical axis of said optical member, and
   adhesives for a contact portion apart from the optical axis of said optical member and a close contact portion have different materials in adhering the contact portions.

6. The apparatus according to claim 1, wherein
   the adjustment members and said support member are held in contact with each other at a plurality of contact portions, and
   some of the plurality of contact portions are adhered while the remaining contact portions are not adhered in adhering the plurality of contact portions.

7. The apparatus according to claim 1, wherein
   the adjustment members and said support member are in contact with each other at a plurality of contact portions, and
   a material of an adhesive at an adhesion portion is changed in adhering the plurality of contact portions.

* * * * *